(12) United States Patent
Maruyama et al.

(10) Patent No.: US 7,469,912 B2
(45) Date of Patent: Dec. 30, 2008

(54) BRACKET OF STEERING RACK HOUSING

(75) Inventors: Tatsuyoshi Maruyama, Kanagawa (JP); Takahide Kaneko, Kanagawa (JP); Katsuhiro Hoshi, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 407 days.

(21) Appl. No.: 10/976,791

(22) Filed: Nov. 1, 2004

(65) Prior Publication Data

US 2005/0104314 A1 May 19, 2005

(30) Foreign Application Priority Data

Oct. 31, 2003  (JP)  ............... 2003-373382
May 28, 2004  (JP)  ............... 2004-158487

(51) Int. Cl.
*B62D 3/12* (2006.01)

(52) U.S. Cl. ................................. 280/93.515

(58) Field of Classification Search ............ 280/93.515, 280/93.514; 267/293, 140.12
See application file for complete search history.

(56) References Cited

U.S. PATENT DOCUMENTS 5,680,804 A * 10/1997 Eberhart ................... 91/375 A
6,176,343 B1 * 1/2001 Vincent et al. ............... 180/428

FOREIGN PATENT DOCUMENTS

| GB | 527 780 | 10/1940 |
|---|---|---|
| GB | 2 317 434 | 3/1998 |
| JP | 2002-160647 | 6/2002 |
| JP | 2002-160647 A | 6/2002 |
| JP | 2003-021194 | 1/2003 |
| JP | 2003-065388 | 3/2003 |
| JP | 2005132302 A * | 5/2005 |

* cited by examiner

*Primary Examiner*—Faye M. Fleming
(74) *Attorney, Agent, or Firm*—Antonelli, Terry, Stout & Kraus, LLP.

(57) ABSTRACT

A bracket for connecting a steering rack housing to a vehicle body comprises a cylindrical inner member that is secured to one of the steering rack housing and the vehicle body; an outer member having a cylindrical bore in which the cylindrical member is disposed leaving a cylindrical space therebetween, the outer member being secured to the other one of the steering rack housing and the vehicle body; a first cylindrical elastic member received in the cylindrical space while being compressed between the inner and outer members; and a second elastic member put on at least one of axial ends of the outer member. The first and second elastic members are produced through different production processes.

18 Claims, 11 Drawing Sheets

GROUND

BRACKET OF STEERING RACK HOUSING

BACKGROUND OF THE INVENTION

1. Field of the Invention

The present invention relates in general to brackets used in wheeled motor vehicles, and more particularly to brackets that support a steering rack housing of a power steering system in such a manner as to suppress or at least minimize a transmission of vibration from the vehicle body to the steering rack housing.

2. Description of the Related Art

In order to clarify the task of the present invention, one related art of such brackets will be briefly described, which is shown in Laid-Open Japanese Patent Application (Tokkai) 2002-160647.

The bracket of this laid-open application generally comprises an inner member fixed to a vehicle body, an outer member fixed to a steering rack housing, an elastic shock absorbing member interposed between the inner and outer members, and a pair of annular raised portions defined by the elastic shock absorbing member. By changing the shape and size of the annular raised portions, the resiliency (or spring characteristic) of the steering rack housing relative to the vehicle body is changed.

SUMMARY OF THE INVENTION

However, the bracket disclosed by the laid-open application fails to exhibit a satisfied performance. That is, due to inherent construction of the elastic shock absorbing member, the adjustable range of a resiliency (or spring characteristic) of the steering rack housing relative to the vehicle body is very limited.

It is therefore an object of the present invention to provide a bracket which assures an increased adjustable range of a resiliency (or spring characteristic) of the steering rack housing relative to the vehicle body.

In accordance with a first aspect of the present invention, there is provided a bracket for connecting a steering rack housing to a vehicle body, which comprises a cylindrical inner member that is secured to one of the steering rack housing and the vehicle body; an outer member having a cylindrical bore in which the cylindrical member is disposed leaving a cylindrical space therebetween, the outer member being secured to the other one of the steering rack housing and the vehicle body; a first cylindrical elastic member received in the cylindrical space while being compressed between the inner and outer members; and a second elastic member put on at least one of axial ends of the outer member, wherein the first and second elastic members are produced through different production processes.

In accordance with a second aspect of the present invention, there is provided a bracket for connecting a steering rack housing to a vehicle body, which comprises a cylindrical inner member, the cylindrical inner member being adapted to connect to the vehicle body through a bolt that passes through the cylindrical inner member; a cylindrical elastic member molded and bonded on the cylindrical inner member through vulcanization thereby to constitute a cylindrical unit, the cylindrical elastic member having annular recesses at its axially end portions; a cylindrical outer member having a cylindrical bore in which the cylindrical unit is received having the cylindrical elastic member compressed between the inner and outer members, the outer being integral with the steering rack housing; a first annular elastic member attached to one axial end of the cylindrical outer member having a radially inner end thereof intimately received in one of the annular recesses of the cylindrical elastic member; a second annular elastic member attached to the other axial end of the cylindrical outer member having a radially inner end thereof intimately received in the other one of the annular recesses of the cylindrical elastic member; and a washer covering the first annular elastic member and one axial end of the cylindrical inner member and having an opening through which the bolt passes, wherein an elastic coefficient of the cylindrical elastic member is different from that of each of the first and second annular elastic members.

In accordance with a third aspect of the present invention, there is provided a bracket for connecting a steering rack housing to a vehicle body, which comprises an outer member integral with the steering rack housing, the outer member having first and second cylindrical bores formed therethrough; first and second cylindrical inner members each having thereon a cylindrical elastic member bonded thereto through vulcanization, the first and second cylindrical inner members being respectively received in the first and second cylindrical bores of the outer member in such manner that each of the cylindrical elastic member is compressed between the outer member and the inner member, the first and second cylindrical inner members being adapted to connect to the vehicle body through first and second bolts that pass through the first and second cylindrical inner members; a first elastic sheet member attached to one end of the outer member and having an opening through which the first bolt passes, the first elastic sheet member having a plurality of projections each being compressed between the outer member and the cylindrical elastic member; a second elastic sheet member attached to the other end of the outer member and having an opening through which the bolt passes, the second elastic sheet member having a plurality of projections each being compressed between the outer member and the cylindrical elastic member; and a washer covering the first elastic sheet member and the one end of the outer member and having openings through which the first and second bolts pass, wherein an elastic coefficient of the cylindrical elastic member is different from that of each of the first and second elastic sheet members.

In accordance with a fourth aspect of the present invention, there is provided a method of producing a bracket by which a steering rack housing is connected to a vehicle body, comprising the steps of (a) molding a cylindrical elastic member on a cylindrical outer surface of a cylindrical inner member thereby to constitute a first cylindrical unit, the cylindrical inner member being connected to one of the steering rack housing and the vehicle body; (b) inserting the first cylindrical unit into a cylindrical outer member, the cylindrical outer member being connected to the other one of the steering rack housing and the vehicle body; and (c) putting a second elastic sheet member on an axial end of the cylindrical outer member.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

In the following, embodiments of the present invention will be described in detail with reference to the accompanying drawings.

For ease of understanding, various directional terms, such as, right, left, upper, lower, rightward and the like are used in the following description. However, such terms are to be understood with respect to a drawing or drawings on which corresponding part and portion are shown.

Figure 1:
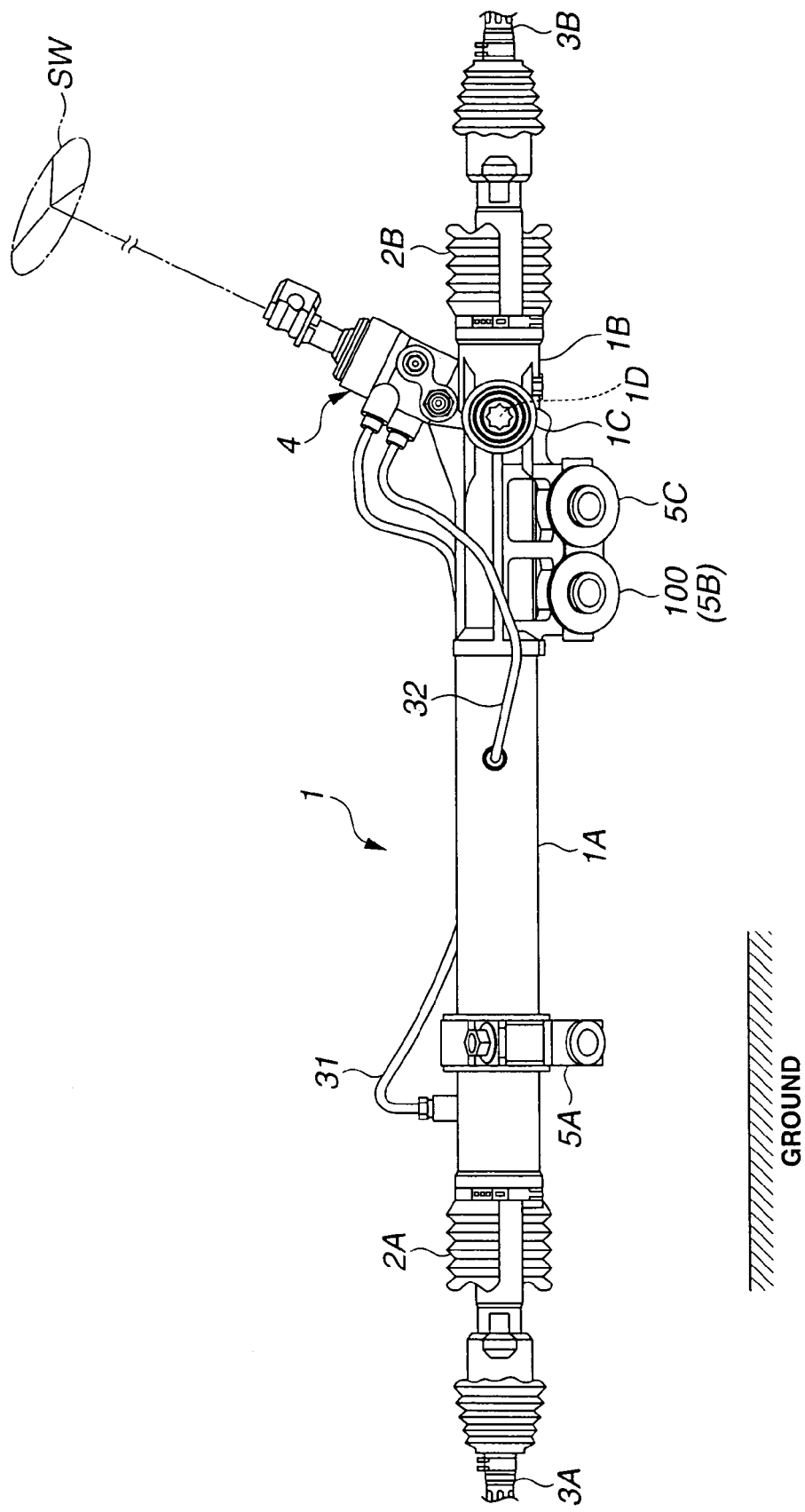
FIG. 1 is a plan view of a steering rack housing to which a bracket of a first embodiment of the present invention is practically applied.
Figure 2:
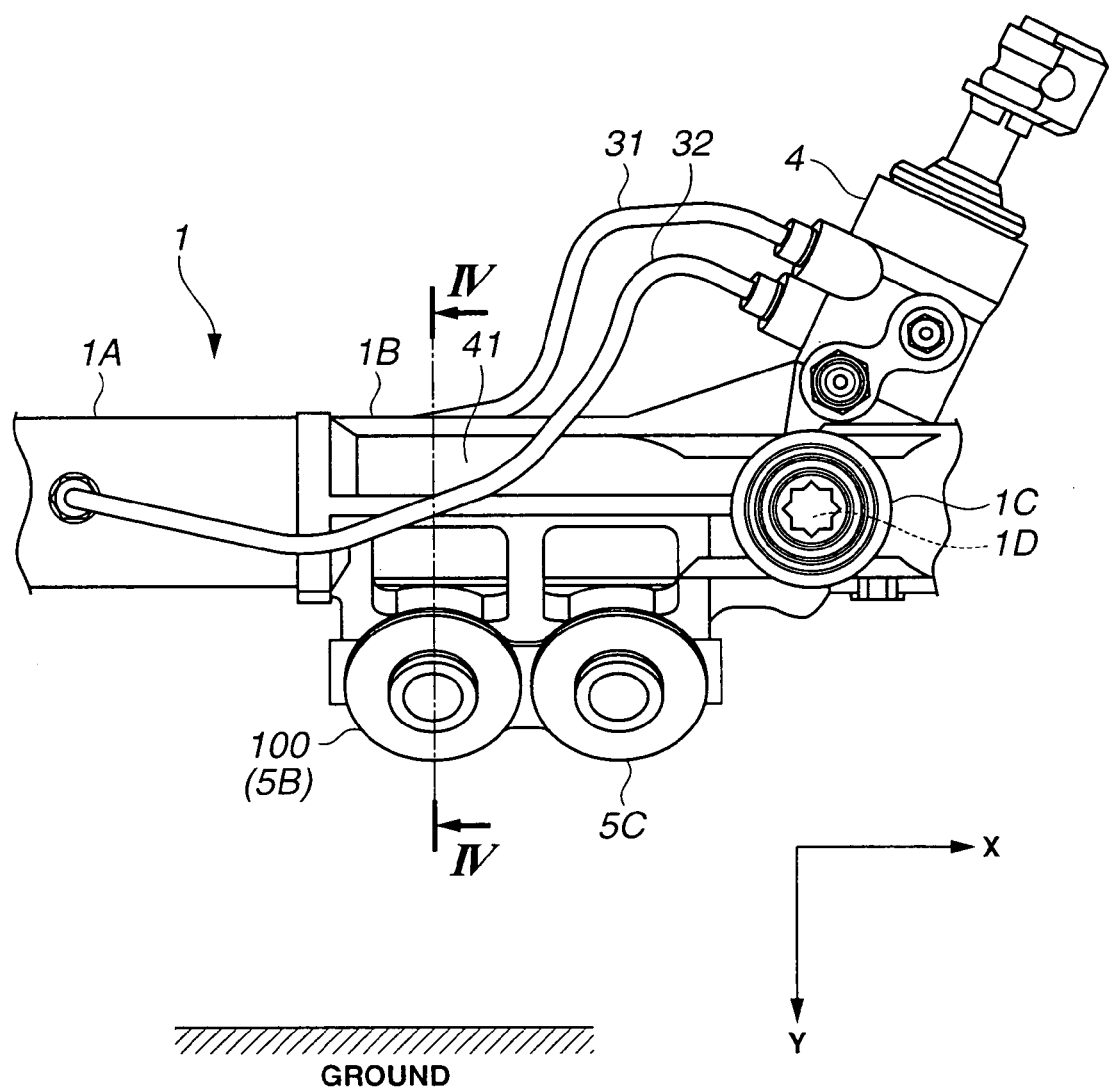
FIG. 2 is an enlarged view of one part of the steering rack housing, where the bracket of the first embodiment is arranged.

Referring to FIGS. 1 to 7, particularly FIGS. 1 and 2, there is shown a bracket 100 (or 5B) of a steering rack housing, which is a first embodiment of the present invention.

FIG. 1 shows a steering rack housing 1 of a power steering system, to which bracket 100 of the first embodiment is practically applied.

Steering rack housing 1 is shaped tubular and constructed of a metal, such as, aluminum or the like. Casting, molding or pressing may be used for producing housing 1.

When mounted in a motor vehicle, steering rack housing 1 is transversely arranged in an engine room of the vehicle with its left part 1A directed leftward and its right part 1B directed rightward.

Figure 4:
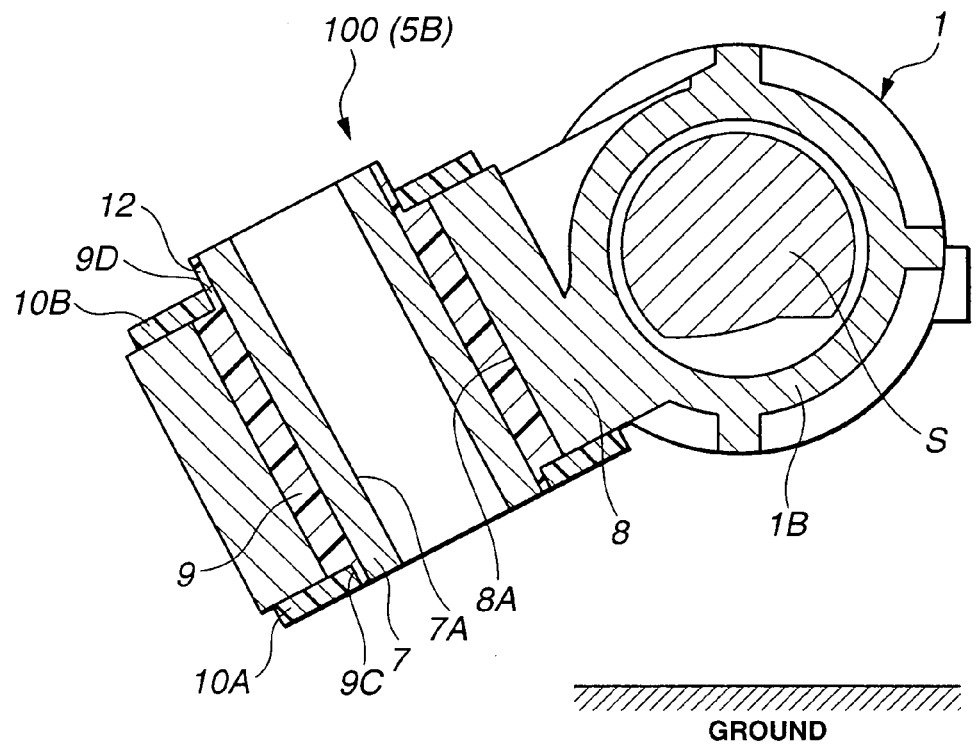
FIG. 4 is an enlarged sectional view taken along the line IV-IV of FIG. 2.

As is understood from FIG. 4, within steering rack housing 1, there is slidably installed a steering rack "S".

Referring back to FIG. 1, steering rack housing 1 is equipped at left and right ends thereof with respective covers 2A and 2B of bellows that cover left and right end portions of steering rack "S". To the left and right end portions of steering rack "S", there are connected tie rods 3A and 3B respectively.

Steering rack housing 1 is integrally formed with a pinion housing 1C in which a pinion (not shown) meshed with steering rack "S" is rotatably installed. The pinion in housing 1C is operatively engaged with an operation shaft 1D that extends upward and obliquely.

A hydraulic power assist device 4 is incorporated with operation shaft 1D to assist the rotational movement of the same. Thus, when a steering wheel "SW" is turned, the turning force (or torque) is magnified by power assist device 4 and transmitted to steering rack "S" through operation shaft 1D and the pinion, so that steered road wheels (not shown) are steered in a desired direction. Designated by numerals 31 and 32 are pipes through which a pressure controlled oil is conveyed between steering rack housing 1 (more specifically, work chambers of the housing 1) and power assist device 4. Power assist device 4 is equipped with a hydraulic controller by which the hydraulic pressure applied to steering rack housing 1 is controlled in accordance with a turning of steering wheel "SW", a speed of the associated motor vehicle and the like.

As shown in FIG. 1, steering rack housing 1 is connected to a vehicle body (not shown) through first, second and third brackets 5A, 5B and 5C.

These three brackets 5A, 5B and 5C are substantially the same in construction, and thus, description of the construction will be directed to only bracket 5B.

Bracket 5B (or 5A or 5C) is constructed to connect steering rack housing 1 to the vehicle body in a manner to suppress the vibration transmission from the vehicle body to steering rack housing 1.

Referring to FIG. 2, there is shown an enlarged view of one part of steering rack housing 1, where second bracket 100 (5A) and third bracket 5C are arranged. As shown, right part 1B of steering rack housing 1 is formed near brackets 100 and 5C with a bracket mount portion 41 that extends axially, that is, in a direction of arrow "X". Thus, each of first, second and third brackets 5A, 100 (5B) and 5C is arranged to project in a direction of arrow "Y".

It is to be noted that the direction of arrow "X" is a transverse direction of an associated motor vehicle, that is, a direction perpendicular to a longitudinal axis of the vehicle.

In general, the resiliency (or spring characteristic) of steering rack housing 1 relative to the vehicle body considerably affects the steering characteristic. In particular, the resiliency of the housing 1 in an axial direction thereof, that is, in a transverse direction of an associated motor vehicle, largely affects a steering feeling with which a driver handles the steering wheel "SW". Thus, hitherto, for controlling the resiliency of steering rack housing 1 in such axial direction, a much higher care has been taken than that in a radial direction of the housing 1. In fact, it has been revealed that if the resiliency of the housing 1 in the axial direction is equal to that in the radial direction, satisfied steering feeling is not given. As will become apparent as the description proceeds, bracket 100 (5B) of the invention is provided by taking the above-mentioned facts into consideration.

Figure 3:
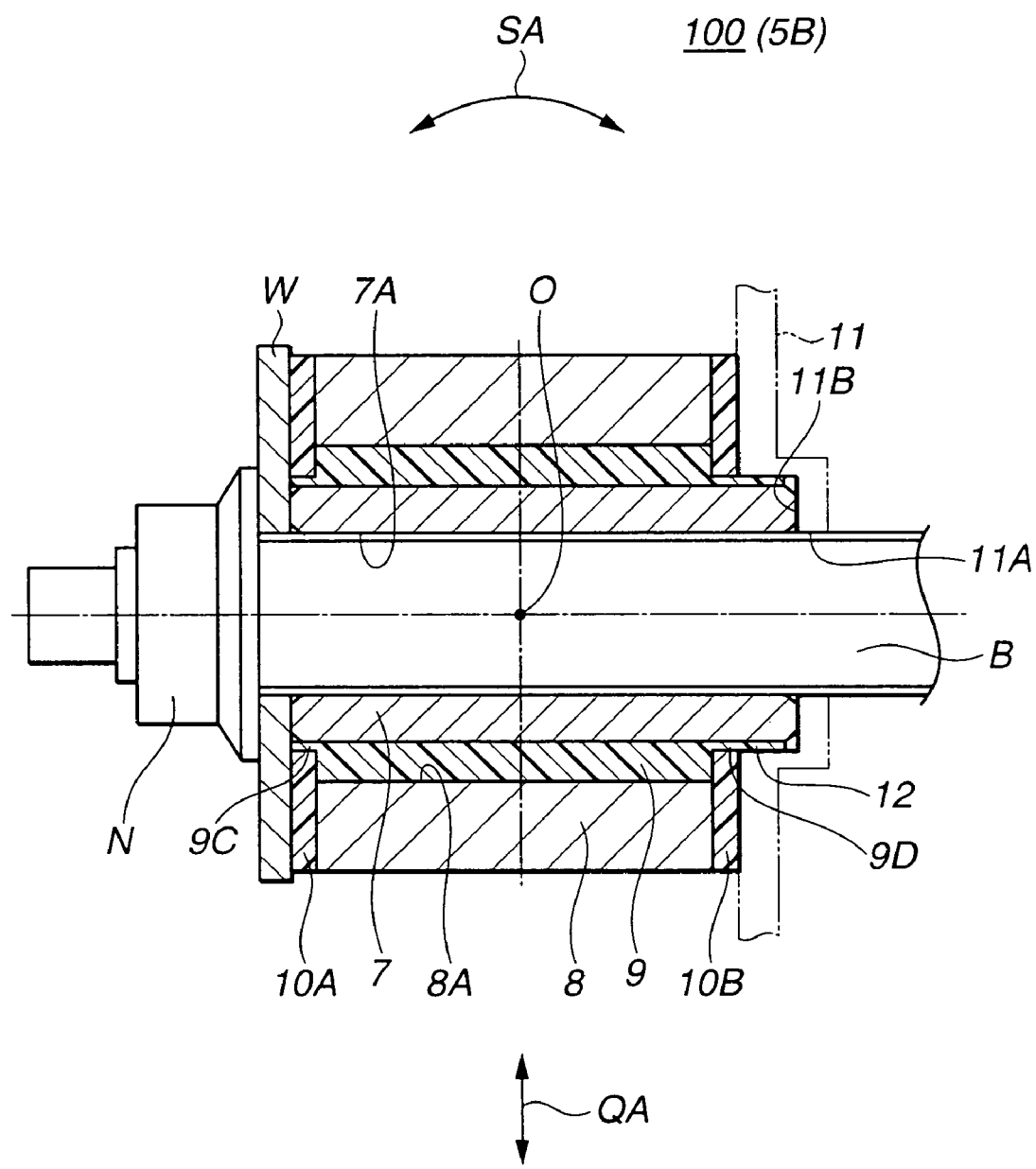
FIG. 3 is an enlarged sectional view of the bracket of the first embodiment.

As is seen from FIG. 3, bracket 100 (5B or 5A or 5C) is shaped generally cylindrical and generally comprises a cylindrical inner member 7, a cylindrical outer member 8, a cylindrical elastic member 9 and two annular elastic members 10A and 10B. These elastic members 9, 10A and 10B are all constructed of rubber materials.

Cylindrical inner member 7, cylindrical elastic member 9 and cylindrical outer member 8 are concentrically disposed on one another as is seen from the drawing, and two annular elastic members 10A and 10B are arranged to put therebetween cylindrical outer member 8 while being put on axial recessed ends of cylindrical elastic member 9, as is seen from the drawing.

As is seen from FIG. 4, cylindrical outer member 8 is integral with right part 1B of steering rack housing 1. A cylindrical bore defined by cylindrical outer member 8 is denoted by numeral 8A.

Figure 5:
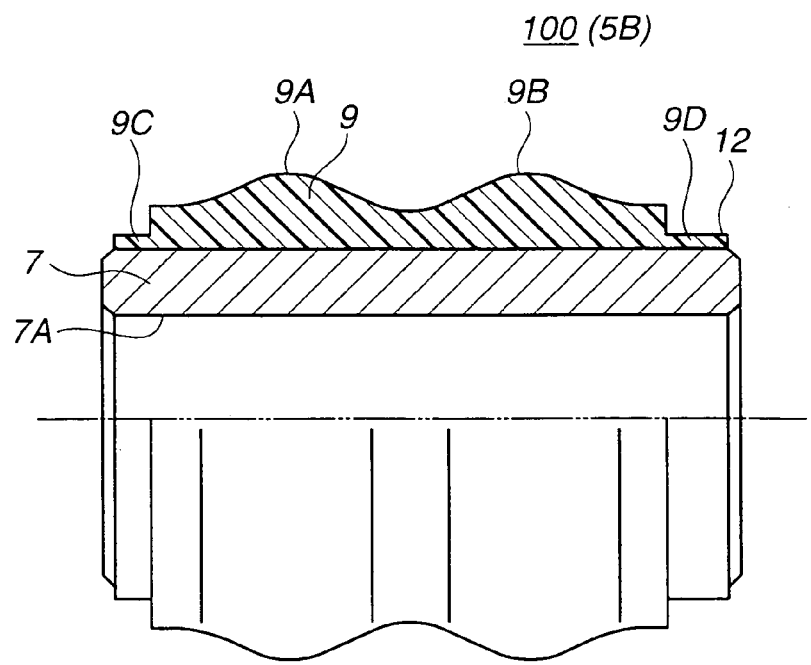
FIG. 5 is an enlarged sectional view of a unit including a cylindrical inner member and a cylindrical elastic member bonded on the inner member, which unit is used in the bracket of the first embodiment.

As is understood from FIG. 5, cylindrical inner member 7 is constructed of aluminum or the like. Cylindrical elastic member 9 is bonded on cylindrical inner member 7 through vulcanization. A cylindrical bore defined by cylindrical inner member 7 is denoted by numeral 7A. As will be described in detail hereinafter, a bolt "B" is coaxially received in cylindrical bore of inner member 7.

For forming elastic member 9 on inner member 7, a method may be employed wherein a material of rubber is poured into an annular clearance that is defined between a cylindrical outer surface of inner member 7 and an inner cylindrical surface of a mold and after hardening of product, that is, the elastic member 9, the mold is removed.

As is seen from FIG. 5, when applied with no stress, cylindrical elastic member 9 has such a shape as to have two raised annular portions 9A and 9B at a major portion thereof and annular recesses 9C and 9D at axially end portions thereof. As is known, for molding such cylindrical elastic member 9, the inner cylindrical surface of the mold may have a corresponding shape. For the reason that will be described hereinafter, an axial length of right recess 9D is greater than that of left recess 9C and thus right recess 9D has an axially projected portion 12.

Figure 6:
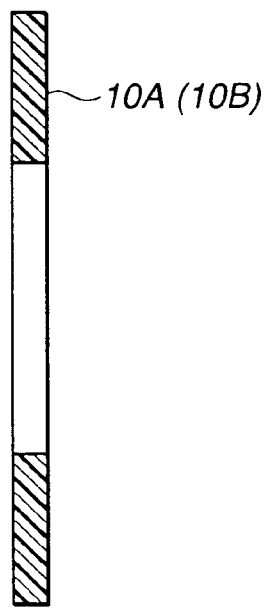
FIG. 6 is an enlarged sectional view of an annular elastic member used in the bracket of the first embodiment.
Figure 7:
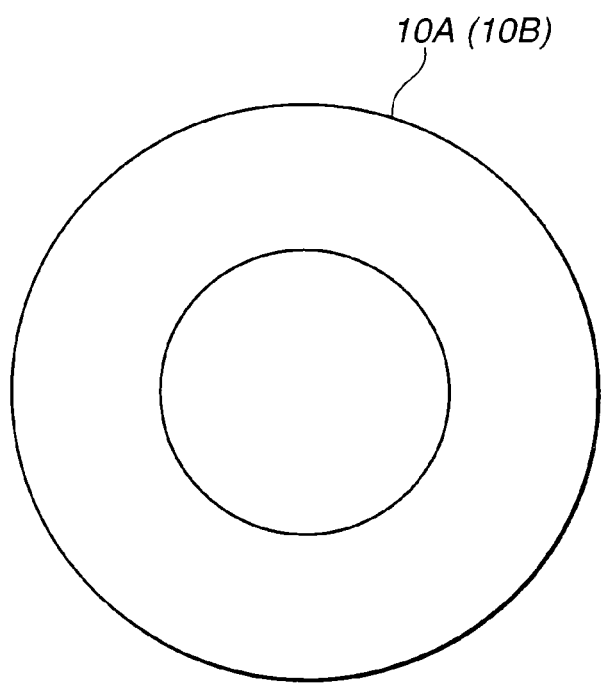
FIG. 7 is a plan view of the annular elastic member of FIG. 6.

As is seen from FIGS. 3, 6 and 7, two annular elastic members 10A and 10B are members that are separate from cylindrical elastic member 9. That is, these two elastic members 10A and 10B are produced through a process that is different from that of cylindrical elastic member 9.

The two annular elastic members 10A and 10B are constructed of an elastic material that is higher in elastic coefficient than that of cylindrical elastic member 9. As is seen from FIG. 3, a thickness of each annular elastic member 10A or 10B is substantially the same as the axial length of recess 9C of cylindrical elastic member 9.

Due to combination of cylindrical elastic member 9 and the two annular elastic members 10A and 10B, the resiliency (or spring characteristic) of steering rack housing 1 relative to the vehicle body can have an enlarged adjustable range as compared with the above-mentioned related art. More specifically, by changing the material of elastic member 9 and that of elastic members 10A and 10B, an elastic unit including these three elastic members 9, 10A and 10B can have an elasticity that is variable in an extended range.

In the following, steps for mounting steering rack housing 1 to the vehicle body through bracket 100 (5A, 5B and 5C) will be described with reference to the drawings, particularly FIG. 3.

First, each of brackets 5A, 5B (or 100) and 5C is connected to steering rack housing 1. For carrying out this connection, cylindrical inner member 7 with cylindrical elastic member 9 already bonded thereto is pressed into cylindrical bore 8A of cylindrical outer member 8 in such a manner that axially projected portion 12 of elastic member 9 is directed toward a vehicle body. With insertion of inner member 7 into outer member 8, raised annular portions 9A and 9B of elastic member 9 (see FIG. 5) are strongly depressed by the cylindrical inner surface of outer member 8 resulting in that an outer surface of elastic member 9 is entirely attached to the cylindrical inner surface of outer member 8. It is to be noted that insertion of inner member 7 into outer member 8 is smoothly carried out because of absence of any practical obstruction member or portion against such insertion.

Then, two annular elastic members 10A and 10B are put on the annular recesses 9C and 9D of elastic member 9 while putting therebetween outer member 8, as is understood from FIG. 3.

With the above-mentioned steps, mounting of bracket 100 (viz., three brackets 5A, 5B and 5C) to steering rack housing 1 is completed thereby to constitute a semi-finished assembly, as will be understood from FIG. 4. As has been mentioned hereinabove, cylindrical outer member 8 is integral with right part 1B of steering rack housing 1.

In one example, the semi-finished assembly is transferred to a vehicle body assembling line. During this transferring, undesired detachment or displacement of inner member 7 from outer member 8 is assuredly suppressed because of the above-mentioned tight pressing of elastic member 9 between inner and outer members 7 and 8. Furthermore, due to a mutual contact between each of annular elastic members 10A and 10B and each of annular recesses 9C and 9D of elastic member 9, that is, due to a frictional contact between the two elastic members, undesired dropping of annular elastic members 10A and 10B from their set positions is suppressed.

Then, as is seen from FIG. 3, at the vehicle body assembling line, bracket 100 integrally connected to steering rack housing 1 is brought into mating with a mounting part 11 of the vehicle body having a bolt "B" of the vehicle body received in cylindrical bore 7A of inner member 7. Mounting part 11 is formed with a circular recess 11B with a center opening 11A through which bolt "B" passes. As shown, when bracket 100 is properly positioned, axially projected portion 12 of cylindrical elastic member 9 on inner member 7 is intimately received in circular recess 11B of mounting part 11 of the vehicle body.

Then, a washer "W" is put on a front end of bracket 100, and then, a nut "N" is engaged with a projected threaded end of bolt "B". By turning nut "N" in a fastening direction, bracket 100 is fixed to the vehicle body. Other two brackets 5A and 5C (see FIG. 1) are also fixed to the vehicle body in substantially same manner.

With the above-mentioned steps, steering rack housing 1 is resiliently connected to the vehicle body through the three brackets 5A, 5B (or 100) and 5C.

If bolt "B" is of a detachable type, insertion of bolt "B" into the bore 7A of inner member 7 may be made after the axially projected portion 12 of elastic member 9 is properly received in circular recess 11B of mounting part 11 of the vehicle body.

Under the above-mentioned arrangement of bracket 100 (or 5A and 5C), cylindrical inner member 7 is connected to the vehicle body, cylindrical outer member 8 is integrally connected to steering rack housing 1, and an elastic unit including cylindrical elastic member 9 and two annular elastic members 10A and 10B is practically interposed between cylindrical inner and outer members 7 and 8. That is, due to provision of the elastic unit therebetween, cylindrical inner and outer members 7 and 8 are resiliently connected to each other and thus steering rack housing 1 is resiliently supported by the vehicle body.

That is, as is seen from FIG. 3, under running of an associated motor vehicle, vibration from the road wheels causes generation of a stress by which bracket 100 (5B) is biased to swing about a center "O" of the outer member 8 in the direction of arrow "SA".

When outer member 8 is inclined rearward due to the transmitted vibration, annular elastic member 10B functions to absorb and damp the inclination, while when outer member 8 is inclined forward due to the same reason, the other annular elastic member 10A functions to absorb and damp the inclination. Thus, forward and rearward swing of outer member 8, that is, forward and rearward swing of steering rack housing 1 is appropriately damped by both annular elastic members 10A and 10B.

When, due to the transmitted vibration, bracket 100 (5B) is applied with a stress in the direction of arrow "QA", that is, in a lateral direction of the vehicle, cylindrical elastic member 9 functions to absorb and damp the stress, so that a steering stability of the vehicle is improved.

Since two annular elastic members 10A and 10B are produced through a process that is different from that of cylindrical elastic member 9 and these two annular elastic members 10A and 10B are constructed of an elastic material that is higher in elastic coefficient than that of cylindrical elastic member 9, the resiliency (or spring characteristic) of steering rack housing 1 relative to the vehicle body can have an enlarged adjustable range. More specifically, the resiliency of steering rack housing 1 in the direction of the width of the vehicle controlled is higher than that in the direction of the length of the vehicle. Thus, a slight understeer characteristic can be possessed by the steering.

Figure 8:
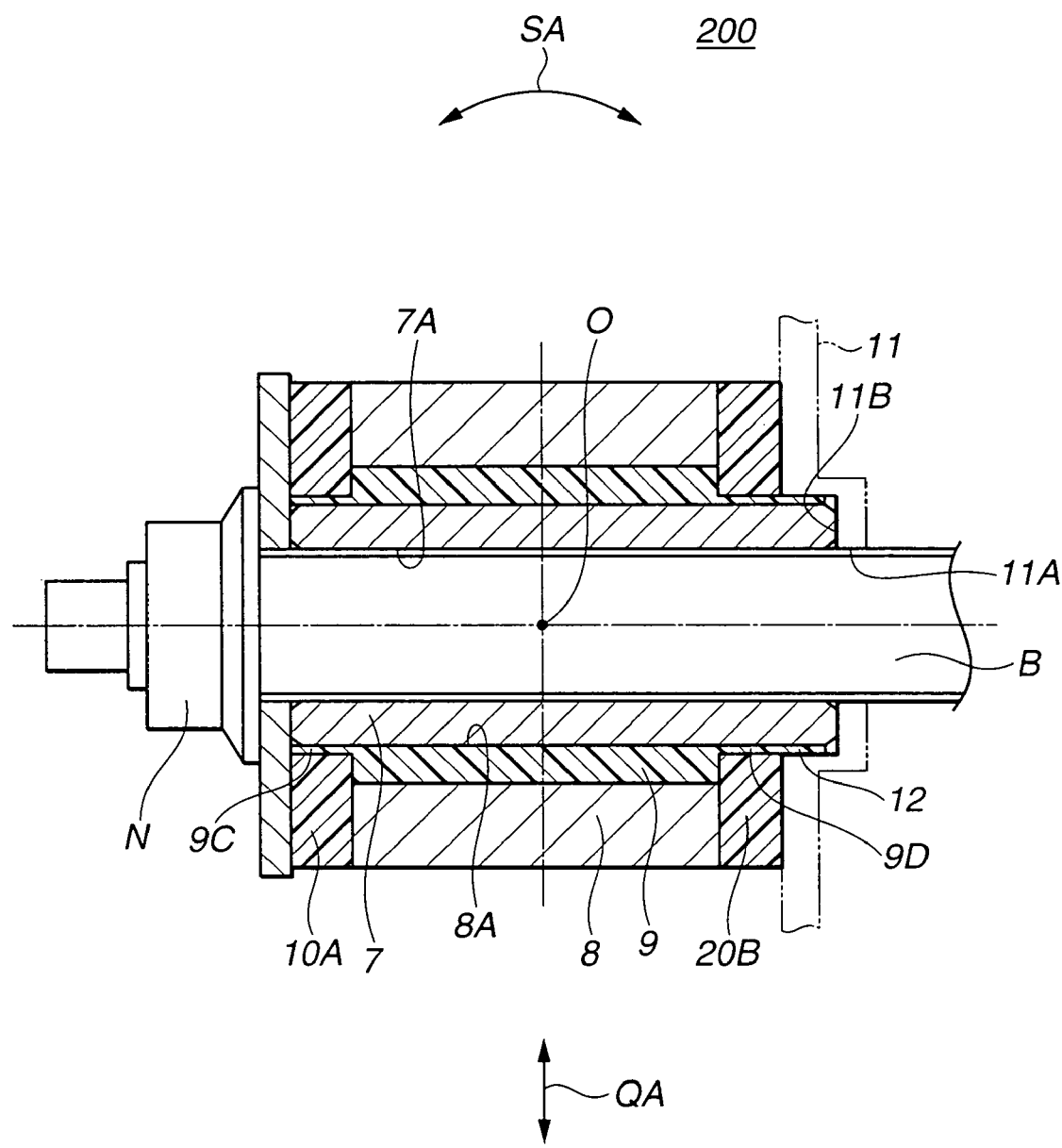
FIG. 8 is a sectional view of a bracket of a second embodiment of the present invention.

Referring to FIG. 8, there is shown a bracket 200 of a steering rack housing, which is a second embodiment of the present invention.

Since bracket 200 of this second embodiment is similar in construction to the above-mentioned bracket 100 of the first embodiment, only portions or parts that are different from those of the first embodiment 100 will be described in the following. The portions and parts that are substantially same as those of the first embodiment 100 are designated by the same numerals.

In bracket 200 of the second embodiment, both annular elastic members 20A and 20B are constructed of an elastic material that is substantially equal in elastic coefficient to that of cylindrical elastic member 9, and these annular elastic members 20A and 20B are bonded to annular recesses 9C and 9D of the elastic member 9 through vulcanization. Of course, cylindrical elastic member 9 is bonded on cylindrical inner member 7 through vulcanization, like in case of the first embodiment 100.

As shown in the drawing, the thickness of each annular elastic member 20A or 20B is somewhat larger than that of the elastic member 9. With enlargement of the thickness, the size of the other parts and portions is enlarged accordingly.

In the following, steps for mounting steering rack housing 1 to the vehicle body through bracket 200 will be described with reference to the drawings, particularly FIG. 8.

First, bracket 200 is connected to steering rack housing 1. For carrying out this connection, cylindrical inner member 7 with cylindrical elastic member 9 already bonded thereto is pressed into cylindrical bore 8A of cylindrical outer member 8 in such a manner that axially projected portion 12 of elastic member 9 is directed toward a vehicle body. It is to be noted that insertion of inner member 7 into outer member 8 is smoothly carried out because of absence of any practical obstruction member or portion against such insertion.

Then, two given molds (not shown) are set at axially end portions of inner member 7, and a material of rubber is poured into the two molds, and after hardening of products, that is, the annular elastic members 20A and 20B, the molds are removed. The annular elastic members 20A and 20B thus molded are bonded to both elastic member 9 and outer member 8 through vulcanization. By selecting a depth of each mold, the thickness of annular elastic member 20A or 20B can be changed.

With the above-mentioned steps, mounting of bracket 200 to steering rack housing 1 is completed thereby to constitute a semi-finished assembly, as will be understood from FIG. 4.

As has been mentioned hereinabove, cylindrical outer member 8 is integral with steering rack housing 1.

Then, the semi-finished assembly is transferred to a vehicle body assembling line. During this transferring of the assembly, undesired detachment or displacement of inner member 7 from outer member 8 is assuredly suppressed because of the above-mentioned tight pressing of elastic member 9 between inner and outer members 7 and 8. Furthermore, due to bonding of each annular elastic member 20A or 20B to both elastic member 9 and outer member 8, undesired dropping of the elastic members 20A and 20B from their set positions is suppressed.

Then, as is seen from FIG. 8, at the vehicle body assembling line, bracket 200 is brought into mating with a mounting part 11 of the vehicle body having a bolt "B" of the vehicle body received in cylindrical bore 7A of inner member 7. Mounting part 11 is formed with a circular recess 11B with a center opening 11A through which bolt "B" passes. As shown, when bracket 200 is properly positioned, axially projected portion 12 of cylindrical elastic member 9 on inner member 7 is intimately received in circular recess 11B of mounting part 11 of the vehicle body.

Then, a washer "W" is put on a leading end of bracket 200, and then, a nut "N" is engaged with a projected threaded end of bolt "B". By turning nut "N" in a fastening direction, bracket 200 is fixed to the vehicle body. Like in the first embodiment 100, other two brackets (5A, 5C) having the same construction as bracket 200 are also fixed to the vehicle body in substantially same manner.

With the above-mentioned steps, steering rack housing 1 is connected to the vehicle body through the three brackets 5A, 200 and 5C.

Under the above-mentioned arrangement of bracket 200, cylindrical inner member 7 is connected to the vehicle body, cylindrical outer member is integrally connected to steering rack housing 1, and an elastic unit including cylindrical elastic member 9 and two annular elastic members 20A and 20B is practically interposed between cylindrical inner and outer members 7 and 8. That is, due to provision of the elastic unit therebetween, cylindrical inner and outer members 7 and 8 are resiliently connected to each other and thus steering rack housing 1 is resiliently supported by the vehicle body.

As is understood from the above, in the second embodiment 200, elastic member 9 and each of elastic members 20A and 20B are produced through respective molding processes, elastic members 20A and 20B are constructed to have an elastic coefficient that is substantially equal to that of elastic member 9 and the thickness of each elastic member 20A or 20B is changeable at will. Thus, also in this second embodiment 200, the resiliency (or spring characteristic) of steering rack housing 1 relative to the vehicle body can have an enlarged adjustable range.

If desired, the following modifications may be employed in the above-mentioned first and second embodiments 100 and 200.

First, in addition to the axial thickness, a radial thickness of each annular elastic member 10A, 10B, 20A or 20B may be varied in accordance with the resiliency (or spring characteristic) needed by steering rack housing 1 relative to the vehicle body.

Second, the size and number of the raised annular portions 9A and 9B (see FIG. 5) may be varied in accordance with the resiliency needed by steering rack housing 1.

Third, the size of annular recesses 9C and 9D of cylindrical elastic member 9 may be varied in accordance with the resiliency needed by steering rack housing 1.

Figure 9:
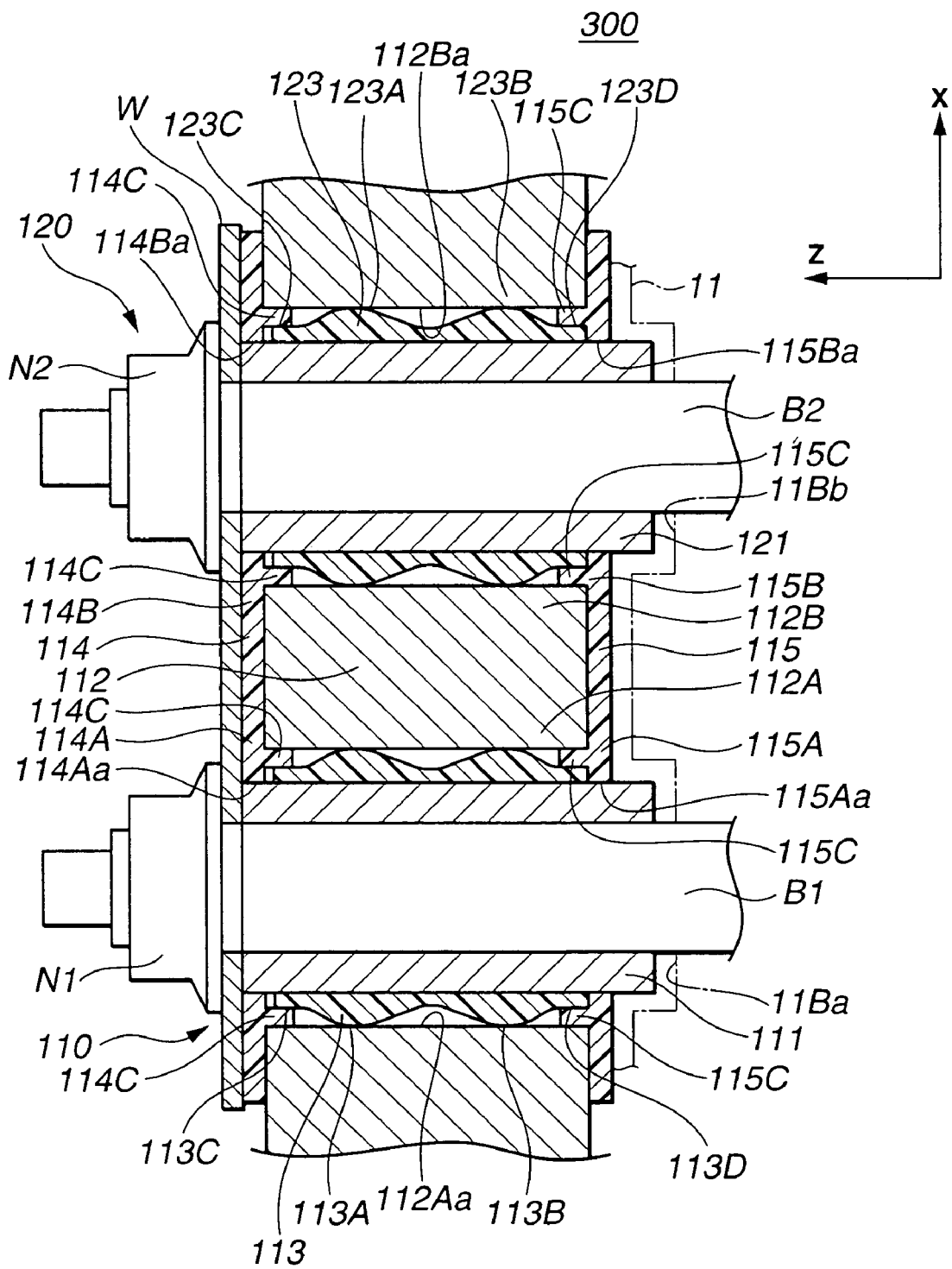
FIG. 9 is a sectional view of a bracket of a third embodiment of the present invention.

Referring to FIGS. 9 to 15, particularly FIG. 9, there is shown a bracket 300 of a steering rack housing 1, which is a third embodiment of the present invention.

Figure 14:
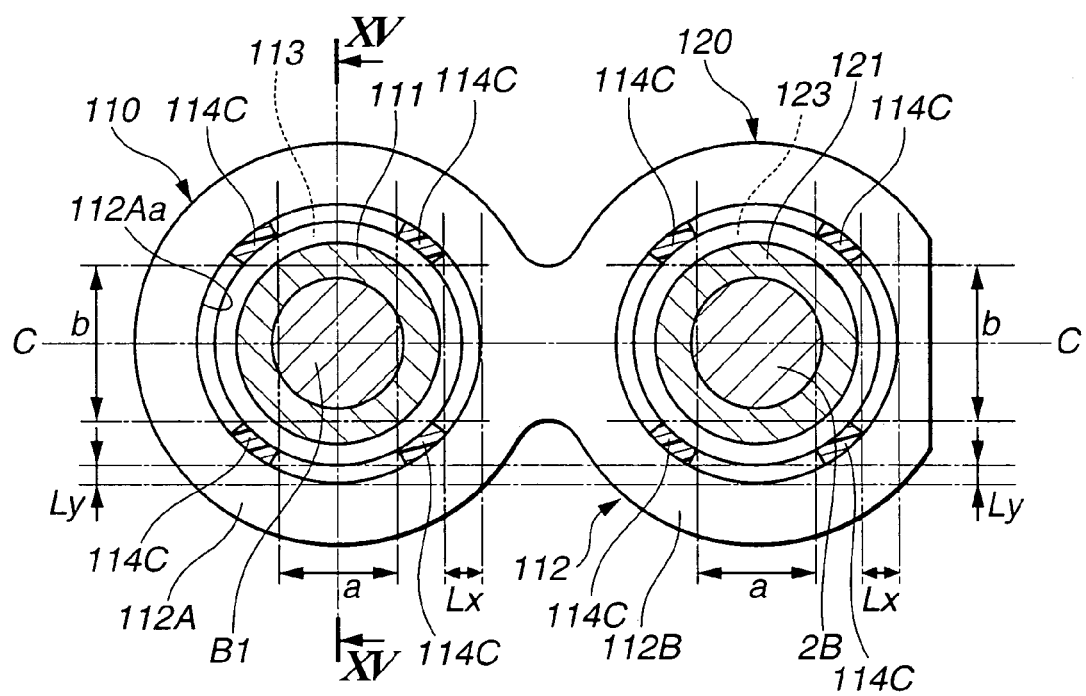
FIG. 14 is a sectional view of the bracket of the third embodiment in an assembled state.
Figure 14:
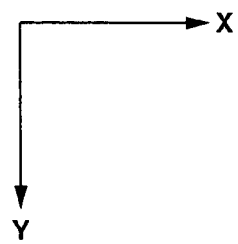

As is seen from FIG. 9, bracket 300 of this third embodiment comprises two, that is, first and second bracket units 110 and 120 which are abreast arranged and as is seen from FIG. 14, these units 110 and 120 are integrated.

These first and second bracket units 110 and 120 have substantially the same construction and have a generally 8-shaped structure, as is seen from FIG. 14.

Referring back to FIG. 9, each bracket unit 110 or 120 generally comprises a cylindrical inner member 111 or 121, an outer block member 112, a cylindrical elastic member 113 or 123 bonded on inner member 111 or 121, a first elastic sheet member 114 and a second elastic sheet member 115. These elastic members 113, 123, 114 and 115 are all constructed of rubber materials.

Preferably, first and second elastic sheet members 114 and 115 are constructed of a rubber material of which elastic coefficient is higher than that of cylindrical elastic member 113 (or 123).

As is seen from FIG. 14, outer block member 112 is a block member having a generally 8-shaped cross section including a first cylindrical portion 112A incorporated with first bracket unit 110 and a second cylindrical portion 112B incorporated with second bracket unit 120. That is, these two cylindrical portions 112A and 112B are integrally connected through a reduced portion (no numeral).

Figure 15:
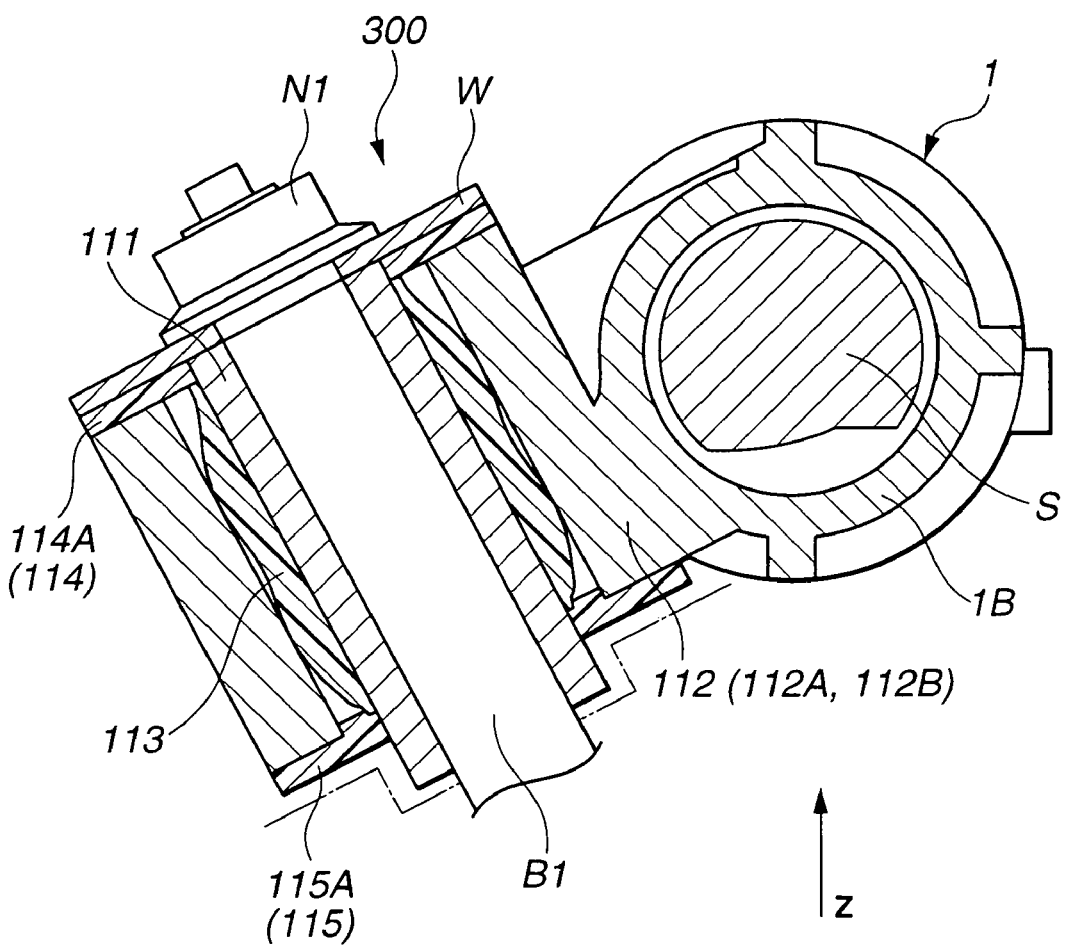
FIG. 15 is a sectional view taken along the line XV-XV of FIG. 14, showing the bracket of the third embodiment practically applied to a steering rack housing.

As is understood from FIG. 15, first and second cylindrical portions 112A and 112B of outer block member 112 are integral with right part 1B of steering rack housing 1, like in the above-mentioned first embodiment 100. Furthermore, as is understood from this drawing, projections 114C and 115C of first and second sheet members 114 and 115 are placed at positions other than a position where an axis of steering rack housing 1 extends.

As is seen from FIGS. 9 and 14, first and second cylindrical portions 112A and 112B are formed with respective cylindrical bores 112Aa and 112Ba through which cylindrical inner members 111 and 121 are received respectively. It is to be noted that in FIG. 9, each bore 112Aa or 112Ba extends in a direction of arrow "Z" that is perpendicular to the direction of the arrow "X".

Figure 10:
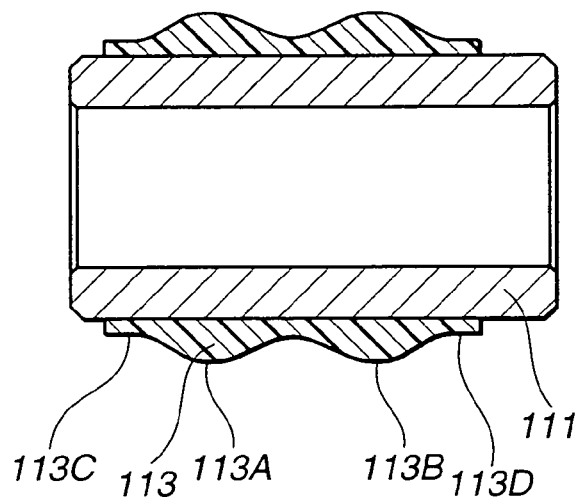
FIG. 10 is a sectional view of a unit including a cylindrical inner member and a cylindrical elastic member bonded on the inner member, which unit is used in the bracket of the third embodiment.

Like in the above-mentioned first embodiment 100, cylindrical inner member 111 or 121 has thereon cylindrical elastic member 113 or 123 bonded thereto through vulcanization. The detail of cylindrical inner member 111 with cylindrical elastic member 113 bonded thereto is shown in FIG. 10.

Thus, upon coupling of outer block member 112 with cylindrical inner member 111 or 121, cylindrical elastic member 113 or 123 is tightly compressed therebetween. Each cylindrical elastic member 113 or 123 has two raised annular portions 113A and 113B (or 123A and 123B) at a major portion thereof. Furthermore, each cylindrical elastic member 113 or 123 has at axially end portions respective annular recesses 113C and 113D (or 123C and 123D). It is to be noted that such annular recesses 113C and 113D (or 123C and 123D) are easily produced when, for molding the elastic member 113 or 123, a mold is set relative to inner member 111 or 121 keeping certain clearances at corresponding positions therebetween.

Figure 11:
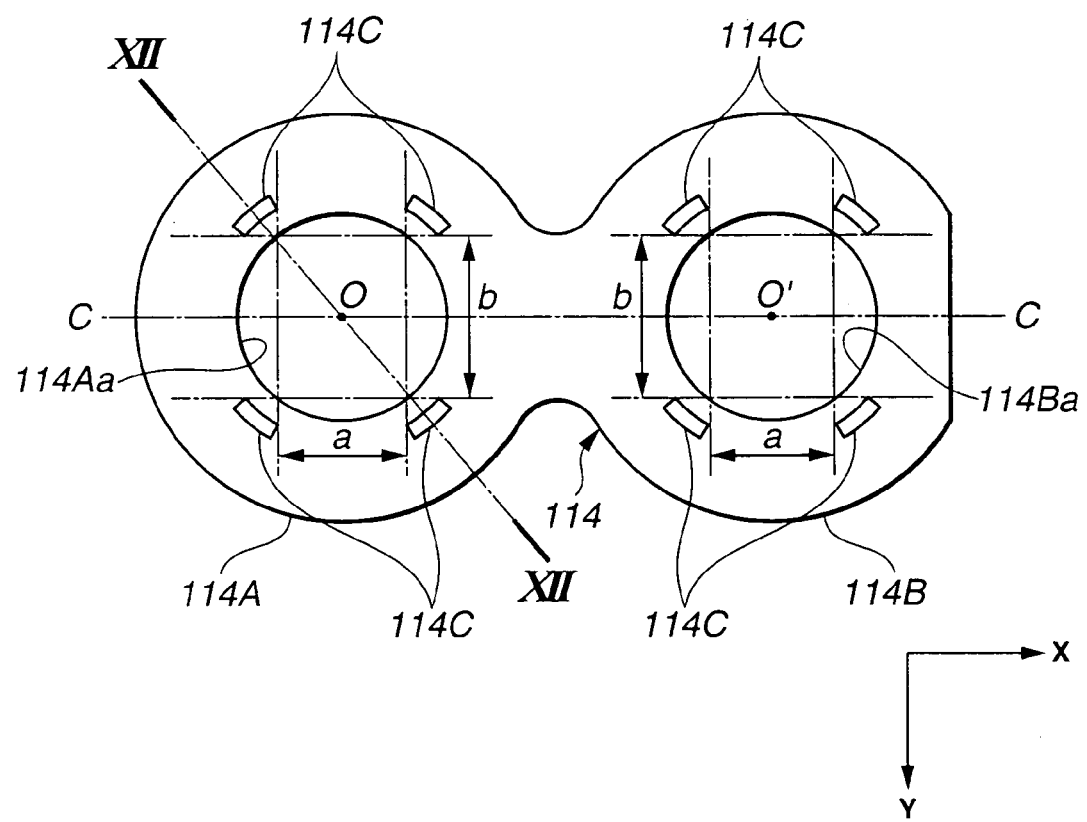
FIG. 11 is a plan view of a first elastic sheet member used in the bracket of the third embodiment.

As is seen from FIG. 11, first elastic sheet member 114 is a generally 8-shaped member and generally comprises first and second circular portions 114A and 114B which are integrally connected through a reduced portion (no numeral).

Although not well shown in the drawings, also second elastic sheet member 115 is a generally 8-shaped member and generally comprises first and second circular portions 115A and 115B which are integrally connected through a reduced portion.

As is seen from FIGS. 9 and 11, first and second circular portions 114A and 114B of first elastic sheet member 114 are respectively formed with circular openings 114Aa and 114Ba.

Like this, as is seen from FIG. 9, first and second circular portions 115A and 115B of second elastic sheet member 115 are respectively formed with circular openings 115Aa and 115Ba.

As is understood from FIG. 9, upon assembly, first elastic sheet member 114 is tightly disposed between a washer "W" and a front surface of outer block member 112, and second elastic sheet member 115 is tightly disposed between a rear surface of outer block member 112 and a mounting part 11 of the vehicle body.

As is seen from FIGS. 9 and 11, first and second circular portions 114A and 114B of first elastic sheet member 114 have each four projections 114C integrally formed thereon. Four projections 114C of first circular portion 114A are tightly put on front annular recess 113C of cylindrical elastic member 113 and four projections 114C of second circular portion 114B are tightly put on front annular recess 123C of cylindrical elastic member 123, as shown.

Like the above, as is seen from FIG. 9, first and second circular portions 115A and 115B of second elastic sheet member 115 have each four projections 115C integrally formed thereon. Four projections 115C of first circular portion 115A are tightly put on rear annular recess 113D of cylindrical elastic member 113 and four projections 115C of second circular portion 115B are tightly put on rear annular recess 123D of cylindrical elastic member 123, as shown.

In the following, steps for mounting steering rack housing 1 to the vehicle body through bracket 300 will be described with reference to the drawings, particularly FIG. 9.

First, bracket 300 is connected to steering rack housing 1. For carrying out this connection, two cylindrical inner members 111 and 121 having cylindrical elastic members 113 and 123 already bonded thereto are inserted into respective cylindrical bores 112Aa and 112Ba of outer block member 112. With insertion of inner members 111 and 121 into cylindrical bores 112Aa and 112Ba, raised annular portions 113A and 113B (or 123A and 123B) of each elastic member 113 or 123 are strongly pressed by the cylindrical inner surface of cylindrical bore 112Aa or 112Ba resulting in that inner member 111 or 121 and outer block member 112 are tightly connected while being permitted to make a relative resilient but slight movement therebetween due to the nature of elastic member 113 or 123.

Then, as is seen from FIGS. 9 and 14, first elastic sheet member 114 is attached to the front side surface of outer block member 112 in such a manner that four projections 114C of first circular portion 114A are tightly put in an annular clearance defined between the cylindrical inner surface of cylindrical bore 112Aa of outer block member 112 and front annular recess 113C of cylindrical elastic member 113, and four projections 114C of second circular portion 114B are tightly put in an annular clearance defined between the cylindrical inner surface of cylindrical bore 112Ba of outer block member 112 and rear annular recess 123C of cylindrical elastic member 123.

Then, like the above, second elastic sheet member 115 is attached to the rear side surface of outer block member 112 in such a manner that four projections 115C of first circular portion 115A are tightly put in an annular clearance defined between the cylindrical inner surface of cylindrical bore 112Aa of outer block member 112 and rear annular recess 113D of cylindrical elastic member 113, and four projections 115C of second circular portion 115B are tightly put in an annular clearance defined between the cylindrical inner surface of cylindrical bore 112Ba of outer block member 112 and rear annular recess 123D of cylindrical elastic member 123.

With the above-mentioned steps, mounting of bracket 300 to steering rack housing 1 is completed thereby to constitute a semi-finished assembly, as will be understood from FIG. 15. As has been mentioned hereinabove, outer block member 112 of the bracket 300 is integral with right part 1B of steering rack housing 1.

The semi-finished assembly is transferred to a vehicle body assembling line. During this transferring, undesired detachment or displacement of first and second elastic sheet members 114 and 115 from the combined unit of inner and outer members 111, 121 and 112 is assuredly suppressed due to the press-fitting of projections 114C and 114C relative to the combined unit.

Then, as is seen from FIG. 9, at the vehicle body assembling line, bracket 300 that has been integrally connected to steering rack housing 1 is brought into mating with a mounting part 11 of the vehicle body having bolts B1 and B2 of the vehicle body received in inner members 111 and 121 respectively. Mounting part 11 is formed with two circular recesses 11Ba and 11Bb with respective center openings through which bolts B1 and B2 pass, as shown. As shown, when bracket 300 is properly positioned, rearward projected ends of inner members 111 and 121 are neatly received in the circular recesses 11Ba and 11Bb, assuring positioning of bracket 300 relative to the vehicle body.

Then, a generally 8-shaped washer "W" is put on a front end of bracket 300, and then, nuts N1 and N2 are engaged with projected threaded ends of bolts B1 and B2. By turning nuts N1 and N2 in a fastening direction, bracket 300 is fixed to the vehicle body.

With the above-mentioned steps, steering rack 1 is resiliently connected to the vehicle body through the bracket 300.

In the following, the detail of each element or part will be described with reference to the corresponding drawing.

As is seen from FIG. 10, cylindrical inner member 111 has thereon cylindrical elastic member 113 already bonded thereon. Elastic member 113 has two raised annular portions 113A and 113B. In the illustrated example, axially opposed end portions of cylindrical inner member 111 are not covered with elastic member 113.

It is to be noted that the other cylindrical inner member 121 has substantially same construction as the inner member 111.

As is seen from FIG. 11, four projections 114C of each of first and second circular portions 114A and 114B of first elastic sheet member 114 are arranged to surround the corresponding circular opening 114Aa or 114Ba. As is seen from the drawing, in either side, a distance "b" between a line passing through the upper two projections 114C and a line passing through the lower two projections 114C is greater than a distance "a" between a line passing through the left two projections 114C and a line passing through the right two projections 114C. It is to be noted that line "C-C" is an imaginary line passing through respective centers "O" and "O" of circular openings 114Aa and 114Ba. When assembled, the line "C-C" is in parallel with the direction of "X".

It is to be noted that the projections 115C of second elastic sheet member 115 have substantially same arrangement as the above-mentioned projections 114C of first elastic sheet member 114.

Figure 12:
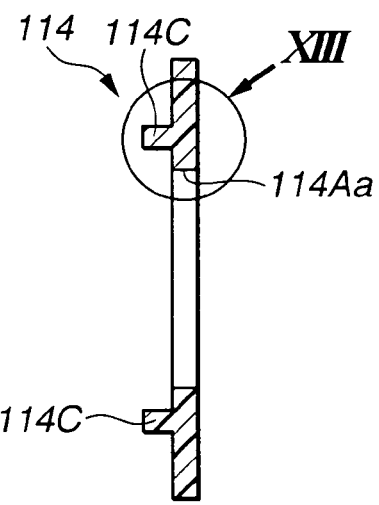
FIG. 12 is a sectional view taken along the line XII-XII of FIG. 11.
Figure 13:
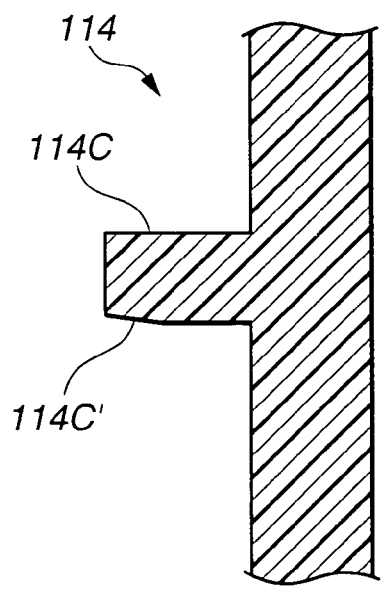
FIG. 13 is an enlarged view of a part enclosed by a circle indicated by the arrow "XIII" in FIG. 12.

As is seen from FIG. 13 that shows in an enlarged scale the part enclosed by a circle "XIII" in FIG. 12, each projection 114C of first elastic member 114 has a tapered inner surface 114C'. With this tapered inner surface 114C', the work for putting the projections 114C into the annular clearance is easily achieved.

It is to be noted that also projections 115C of second elastic member 115 have such tapered surfaces.

In the following, operation or actions of the bracket 300 of the third embodiment in case wherein a driver handles a steering wheel will be described with reference to FIG. 14. It is to be noted that upon mounting of steering rack housing 1 onto the vehicle body through bracket 300, the imaginary line "C-C" that extends across the axes of bolts B1 and B2 becomes in parallel with the direction of arrow "X" of the drawing. That is, the line "C-C" extends transversely with respect to an associated motor vehicle.

When, due to handling of the steering wheel by the driver, outer block member 112 is applied with a certain force in a radial direction, the force is transmitted through cylindrical elastic members 113 and 123 to cylindrical inner members 111 and 121. During this, cylindrical elastic members 113 and 123 are subjected to an elastic deformation.

As is seen from FIG. 14, during the above-mentioned force transmission, the eight projections 114C of first elastic sheet member 114 and the eight projections 115C of second elastic sheet member 115 are also subjected to an elastic deformation. That is, these projections 114C and 115C function to finely control the manner in which the force is transmitted to inner members 111 and 121.

As has been described in the section of FIG. 11, the distance "b" between the line passing through the upper two projections 114C and the line passing through the lower two projections 114C is greater than the distance "a" between the line passing through the left two projections 114C and the line passing through the right two projections 114C. The same arrangement is also employed in the arrangement of the projections 115C of second elastic sheet member 115.

Thus, as will be understood from FIG. 14, the projections 114C and 115C have such a unit function as to softly receive an external force that is applied thereto in the direction of arrow "X" but not to softly receive an external force that is applied thereto in the direction of arrow "Y". This will be understood from the difference between "Lx" that shows a zone that is deformable when the force is applied thereto in the direction of arrow "X" and "Ly" that shows a zone that is deformable when the force is applied thereto in the direction of arrow "Y".

FIG. 15 is a sectional view taken along the line XV-XV of FIG. 14. As shown, upon assembly in a motor vehicle, bracket 300 is kept inclined with steering rack housing 1 extending in a lateral or transverse direction. As is seen from this drawing, an external force in the direction of arrow "Z" is damped mainly by first and second elastic sheet members 114 and 115. Thus, if these two elastic sheet members 114 and 115 are constructed to have different elastic coefficients, the resiliency (or spring characteristic) of steering rack housing 1 relative to the vehicle body can be widely changed.

In the following, advantages given by bracket 300 of the third embodiment of the present invention will be described with reference to FIG. 9.

That is, as has been described hereinabove, bracket 300 is constructed to have two bracket units 110 and 120, each including a cylindrical inner member 111 or 121 through which a bolt B1 or B2 extending from the vehicle body passes, an outer block member 112 that is integral with the steering rack housing 1 and has a cylindrical bore 112Aa or 112Ba is which the cylindrical inner member 111 or 121 is received, a cylindrical elastic member 113 or 123 that is bonded on a cylindrical outer surface of cylindrical inner member 111 or 121 and tightly pressed between the cylindrical outer surface of cylindrical inner member 111 or 121 and a cylindrical inner surface of cylindrical bore 112Aa or 112Ba of outer block member 112, a first elastic sheet member 114 that is attached to a front surface of outer block member 112 having projections 114C tightly put in a front thinner annular clearance defined between the cylindrical inner surface of cylindrical bore 112Aa or 112Ba and a front annular recess 113C or 123C of the cylindrical elastic member 113 or 123, and a second elastic sheet member 115 that is attached to a rear surface of outer block member 112 having projections 115C tightly put in a rear thinner annular clearance defined between the cylindrical inner surface of cylindrical bore 112Aa or 112Ba and a rear annular recess 113D or 123D of the cylindrical elastic member 113 or 123. A washer "W" is put on the first elastic sheet member 114 and respective nuts N1 and N2 are engaged with bolts B1 and B2 to tightly connect bracket 300 to a given portion 11 of the vehicle body.

Thus, as is seen from FIG. 9, the resiliency of steering rack housing 1 (which is integral with outer block member 112) relative to the vehicle body in the direction of arrow "X" (viz., in a transverse direction of an associated vehicle) is controlled by the two cylindrical elastic members 113 and 123. While, the resiliency of steering rack housing 1 in the direction of arrow "Z" (viz., in up-and-down direction of the vehicle) is controlled by the first and second elastic sheet members 114 and 115. Furthermore, due to provision of the projections 114C and 115C, the resiliency of steering rack housing 1 is much finely controlled in every directions. In other words, the resiliency (or spring characteristic) of steering rack housing 1 relative to the vehicle body can have an enlarged adjustable range.

During the transferring of the semi-finished assembly to a vehicle body assembling line, undesired detachment or displacement of first and second elastic sheet members 114 and 115 from the combined unit of inner and outer members 111, 121 and 112 is assuredly suppressed due to the press-fitting of projections 114C and 114C relative to the combined unit.

As is seen from FIG. 13, due to provision of the tapered inner surfaces 114C' of projections 114C and 115C, the work for attaching first and second elastic sheet members 114 and 115 to the given positions is easily carried out.

The entire contents of Japanese Patent Applications 2003-373382 (filed Oct. 31, 2003) and 2004-158487 (filed May 28, 2004) are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A bracket for connecting a steering rack housing to a vehicle body, comprising:
   a cylindrical inner member that is configured to be secured to one of the steering rack housing and the vehicle body;
   an outer member having a cylindrical bore in which the cylindrical member is disposed leaving a cylindrical space therebetween, the outer member being configured to be secured to the other one of the steering rack housing and the vehicle body;
   a first cylindrical elastic member received in the cylindrical space while being compressed between the inner and outer members;
   a second elastic member put on at least one of axial ends of the outer member; and
   wherein the first and second elastic members are separate members and produced through different production processes, and
   wherein the first cylindrical elastic member has at axially end portions thereof annular recesses, and in which one of the annular recesses intimately receives therein a part of the second elastic member.

2. A bracket as claimed in claim 1, in which the first and second elastic members are constructed of elastic materials that have different elastic coefficients.

3. A bracket as claimed in claim 1, in which the first cylindrical elastic member is bonded onto the cylindrical inner member through vulcanization.

4. A bracket as claimed in claim 1, in which the first cylindrical elastic member is bonded onto the cylindrical inner member through vulcanization, and in which the annular recesses are produced at the time of molding the first cylindrical elastic member.

5. A bracket as claimed in claim 1, in which the first and second elastic members are constructed of elastic materials that have substantially same elastic coefficient, and in which the first and second elastic members have different cross sections.

6. A bracket as claimed in claim 1, in which the second elastic member is formed with projections that are compressed between the inner and outer members so as to suppress detachment or displacement of the second elastic member from the bracket.

7. A bracket as claimed in claim 6, in which the projections are arranged at a position other than a position where an axis of the steering rack housing extends, and in which the projections are arranged to surround the cylindrical inner member.

8. A bracket as claimed in claim 6, in which the first cylindrical elastic member is bonded onto the cylindrical inner member through vulcanization, and in which annular recesses are produced at axially end portions of the first cylindrical elastic member at the time of molding the same.

9. A bracket as claimed in claim 6, in which each of the projections has a tapered tip for facilitating it's thrusting into a clearance defined between the inner and outer members.

10. A bracket for connecting a steering rack housing to a vehicle body, comprising:
    a cylindrical inner member that is configured to be secured to one of the steering rack housing and the vehicle body;
    an outer member having a cylindrical bore in which the cylindrical member is disposed leaving a cylindrical space therebetween, the outer member being configured to be secured to the other one of the steering rack housing and the vehicle body;
    a first cylindrical elastic member received in the cylindrical space while being compressed between the inner and outer members;
    a second elastic member put on at least one of axial ends of the outer member; and
    wherein the first and second elastic members are separate members and produced through different production processes,
    wherein the second elastic member is formed with projections that are compressed between the inner and outer members so as to surpass detachment or displacement of the second elastic member from the bracket,
    the bracket further including a second bracket which includes:

another cylindrical inner member that is secured to one of the steering rack housing and the vehicle body;

the outer member having another cylindrical bore in which said another cylindrical inner member is disposed leaving another cylindrical space therebetween, the outer member being secured to the other one of the steering rack housing and the vehicle body;

another first cylindrical elastic member received in said another cylindrical space while being compressed between said another cylindrical inner member and the outer member; and another second elastic member put on at least one of axial ends of the outer member.

11. A method of producing a bracket by which a steering rack housing is connected to a vehicle body, comprising the steps of:

(a) molding a cylindrical elastic member on a cylindrical outer surface of a cylindrical inner member thereby to constitute a first cylindrical unit, the cylindrical inner member being connected to one of the steering rack housing and the vehicle body;

(b) inserting the first cylindrical unit into a cylindrical outer member, the cylindrical outer member being connected to the other one of the steering rack housing and the vehicle body; and (c) putting a second elastic sheet member on an axial end of the cylindrical outer member;

wherein the cylindrical elastic member and the second elastic sheet member are constructed of elastic materials that have different elastic coefficients.

12. A method as claimed in claim 11, in which the step (a) includes a process through which the cylindrical elastic member on the cylindrical inner member has annular recesses at axially opposed end portions.

13. A method as claimed in claim 11, in which the step (c) includes a process through which one of the annular recesses is passed through an opening formed in the second elastic sheet member.

14. A bracket for connecting a steering rack housing to a vehicle body, comprising:

a cylindrical inner member, the cylindrical inner member being adapted to connect to the vehicle body through a bolt that passes through the cylindrical inner member;

a cylindrical elastic member molded and bonded on the cylindrical inner member through vulcanization thereby to constitute a cylindrical unit, the cylindrical elastic member having annular recesses at its axially end portions;

a cylindrical outer member having a cylindrical bore in which the cylindrical unit is received having the cylindrical elastic member compressed between the inner and outer members, the outer being integral with the steering rack housing;

a first annular elastic member attached to one axial end of the cylindrical outer member having a radially inner end thereof intimately received in one of the annular recesses of the cylindrical elastic member;

a second annular elastic member attached to the other axial end of the cylindrical outer member having a radially inner end thereof intimately received in the other one of the annular recesses of the cylindrical elastic member; and a washer covering the first annular elastic member and one axial end of the cylindrical inner member and having an opening through which the bolt passes, wherein an elastic coefficient of the cylindrical elastic member is different from that of each of the first and second annular elastic members.

15. A bracket as claimed in claim 14, in which a thickness of a major portion of the cylindrical elastic member is greater than that of each of the first and second annular elastic members.

16. A bracket as claimed in claim 14, in which a thickness of a major portion of the cylindrical elastic member is smaller than that of each of the first and second annular elastic members.

17. A bracket for connecting a steering rack housing to a vehicle body, comprising:

an outer member integral with the steering rack housing, the outer member having first and second cylindrical bores formed therethrough;

first and second cylindrical inner members each having thereon a cylindrical elastic member bonded thereto through vulcanization, the first and second cylindrical inner members being respectively received in the first and second cylindrical bores of the outer member in such manner that each of the cylindrical elastic member is compressed between the outer member and the inner member, the first and second cylindrical inner members being adapted to connect to the vehicle body through first and second bolts that pass through the first and second cylindrical inner members;

a first elastic sheet member attached to one end of the outer member and having an opening through which the first bolt passes, the first elastic sheet member having a plurality of projections each being compressed between the outer member and the cylindrical elastic member;

a second elastic sheet member attached to the other end of the outer member and having an opening through which the bolt passes, the second elastic sheet member having a plurality of projections each being compressed between the outer member and the cylindrical elastic member; and a washer covering the first elastic sheet member and the one end of the outer member and having openings through which the first and second bolts pass, wherein an elastic coefficient of the cylindrical elastic member is different from that of each of the first and second elastic sheet members.

18. A bracket as claimed in claim 17, in which the cylindrical elastic member has at its axial end portions respective annular recesses in which the projections of the first and second elastic sheet members are intimately received.

* * * * *

UNITED STATES PATENT AND TRADEMARK OFFICE
CERTIFICATE OF CORRECTION

| | | |
|---|---|---|
| PATENT NO. | : 7,469,912 B2 | Page 1 of 1 |
| APPLICATION NO. | : 10/976791 | |
| DATED | : December 30, 2008 | |
| INVENTOR(S) | : Maruyama et al. | |

It is certified that error appears in the above-identified patent and that said Letters Patent is hereby corrected as shown below:

ON THE TITLE PAGE:

Item (73) Assignee should read:

Item (73)  Assignee:  Hitachi, Ltd., Tokyo (JP)
and
Unisia JKC Steering Systems Co., Ltd., Atsugi-shi (JP)

Signed and Sealed this
Twenty-second Day of November, 2011

David J. Kappos
*Director of the United States Patent and Trademark Office*

UNITED STATES PATENT AND TRADEMARK OFFICE
Certificate

Patent No. 7,469,912 B2　　　　　　　　　　　　　　　　　　　　　Patented: December 30, 2008

On petition requesting issuance of a certificate for correction of inventorship pursuant to 35 U.S.C. 256, it has been found that the above identified patent, through error and without any deceptive intent, improperly sets forth the inventorship.
 Accordingly, it is hereby certified that the correct inventorship of this patent is: Tatsuyoshi Maruyama, Kanagawa (JP); Takahide Kaneko, Kanagawa (JP); Katsuhiro Hoshi, Kanagawa (JP); and Kazuyuki Kameda, Kanagawa (JP).

Signed and Sealed this Seventh Day of May 2013.

<div style="text-align:right">

PAUL N. DICKSON
*Supervisory Patent Examiner*
Art Unit 3616
Technology Center 3600

</div>